US011711145B2

(12) United States Patent
Ekkel et al.

(10) Patent No.: US 11,711,145 B2
(45) Date of Patent: Jul. 25, 2023

(54) BEAM LOCKING FOR FREE SPACE OPTICAL COMMUNICATION USING VERTICAL-CAVITY SURFACE-EMITTING LASERS

(71) Applicant: SIGNIFY HOLDING B.V., Eindhoven (NL)

(72) Inventors: Jan Ekkel, Eindhoven (NL); Harry Broers, Eindhoven (NL); Maurice Herman Johan Draaijer, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 109 days.

(21) Appl. No.: 17/439,507

(22) PCT Filed: Mar. 17, 2020

(86) PCT No.: PCT/EP2020/057228
§ 371 (c)(1),
(2) Date: Sep. 15, 2021

(87) PCT Pub. No.: WO2020/193274
PCT Pub. Date: Oct. 1, 2020

(65) Prior Publication Data
US 2022/0166504 A1    May 26, 2022

(30) Foreign Application Priority Data

Mar. 25, 2019   (EP) .................................... 19164792

(51) Int. Cl.
*H04B 10/00*      (2013.01)
*H04B 10/112*     (2013.01)
*H04J 14/00*      (2006.01)

(52) U.S. Cl.
CPC .................................. *H04B 10/112* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 6,804,422 B1   10/2004   Bajorins et al.
7,403,719 B2    7/2008   Koontz
(Continued)

FOREIGN PATENT DOCUMENTS

EP   3316497 A1   5/2018
EP   3457593 A1   3/2019
(Continued)

OTHER PUBLICATIONS

Finisar Corporation, Application Note AN-2109, "High Power VCSELs for Gesture Recognition", 2012, pp. 1-5.
(Continued)

*Primary Examiner* — Daniel G Dobson (57) ABSTRACT

Beam locking for free space optical communication systems using vertical-cavity surface-emitting laser arrays. The method includes: transmitting a communication beam from a light source of a first free space optical unit to a detector arranged proximate to a second FSO unit, the second FSO unit having reflective elements; transmitting one or more alignment beams from the light source to the second FSO unit; reflecting the one or more alignment beams or one or more portions thereof from the one or more reflective elements; detecting the reflected one or more alignment beams or one or more portions thereof at a light sensor; and determining whether the first FSO unit is aligned with the second FSO unit or whether the at least one communication beam is affected by one or more environmental conditions based on the detection of the reflected one or more alignment beams or the one or more portions thereof.

14 Claims, 8 Drawing Sheets

(58) Field of Classification Search
CPC ............ H04B 10/1127; H04B 10/1129; H04B 10/114; H04B 10/1141; H04B 10/1143; H04B 10/1149; H04B 10/116; H04B 10/118

See application file for complete search history.

(56) References Cited

U.S. PATENT DOCUMENTS

| | | |
|---|---|---|
| 7,457,545 B2 | 11/2008 | Wirth et al. |
| 7,809,278 B2 | 10/2010 | Morris et al. |
| 2016/0134367 A1 | 5/2016 | Bitauld |
| 2018/0088280 A1* | 3/2018 | Kim ................... H04B 10/1129 |
| 2019/0074899 A1 | 3/2019 | Joseph |
| 2019/0372669 A1* | 12/2019 | Ziegler ................ H04B 10/503 |

FOREIGN PATENT DOCUMENTS

| | | |
|---|---|---|
| GB | 2499693 A | 8/2013 |
| WO | 2008068544 A1 | 6/2008 |
| WO | 2018014131 A1 | 1/2018 |

OTHER PUBLICATIONS

J. Nielsen, "Nielsen's Law of Internet Bandwidth", Apr. 4, 1998, Updated Sep. 27, 2019, pp. 1-7.

\* cited by examiner

BEAM LOCKING FOR FREE SPACE OPTICAL COMMUNICATION USING VERTICAL-CAVITY SURFACE-EMITTING LASERS

CROSS-REFERENCE TO PRIOR APPLICATIONS

This application is the U.S. National Phase application under 35 U.S.C. § 371 of International Application No. PCT/EP2020/057228, filed on Mar. 17, 2020, which claims the benefit of European Patent Application No. 19164792.4, filed on Mar. 25, 2019. These applications are hereby incorporated by reference herein.

FIELD OF THE INVENTION

The present disclosure is directed generally to free space optical communication systems and methods using vertical-cavity surface-emitting lasers to maintain optical alignment in free space optical communication systems.

BACKGROUND

Existing data transmission technologies rely primarily on physical connections (e.g., fiber optic cables) extending between network nodes and wireless optical communication systems. Wireless optical communication systems are attractive since they avoid the costs associated with installing and maintaining physical connections. Free space optical communication systems propagate light through free space (open air) to wirelessly transmit data. Typical free space optical communication systems include a minimum of two units, both equipped with a laser and a detector establishing separate beams for bidirectional communication. However, the transmitter and receiver units in outdoor networks can be mechanically unstable due to vibrations, thermal expansion, weather and/or other factors. Accordingly, maintaining a constant line-of-sight connection between the transmitter and the receiver is critical to avoid FSO link failure or a degraded link budget. Active feedback loops, which rely at least in part on a means of communication between the transmitter and the receiver, are currently used to maintain FSO link budget quality. Active sensors at the receiver detect the light beam, or a portion of the beam, and the beam can be readjusted based on information provided via an active feedback loop. Unfortunately, active feedback loops can be expensive and complex. Additionally, the active sensors at the receiver require calibration within certain boundaries and cleaning. Moreover, the communication infrastructure with the transmitter has a low latency link.

Accordingly, there is a continued need in the art for inexpensive and simpler effective wireless optical communication systems and methods that do not require active sensors.

SUMMARY OF THE INVENTION

The present disclosure is directed to inventive systems and methods for free space optical (FSO) communication, particularly to maintaining a constant line-of-sight connection between a transmitter and a receiver to avoid FSO link failure without using an active feedback loop. Systems disclosed herein include passive optical materials at the receiver side and a smart element at the transmitter side that assists in maintaining a transmission path between the FSO units. The passive optical materials include retroreflective components arranged at the destination (target) to reflect at least a portion of one or more alignment beams to a light sensor located near or at the transmitter. The reflected light (as well as the absence of reflected light) of one or more alignment beams provides information used to adjust one or more operating parameters of the beams and/or activate other pixels of the one- or two-dimensional VCSEL array to maintain a constant line-of-sight connection between the transmitter and the receiver to avoid FSO link failure. Critically, the one or more VCSEL beams that are used for the communication link are separate from the one or more VCSEL beams that are used for the alignment beam. Thus, once a beam lock is achieved for a communication beam between the transmitter and the receiver, a good link budget can be maintained without requiring active beam steering or active contribution from the receiver. Moreover, maintaining a good link budget based on reflected light signals is faster and more reliable compared to systems and methods including an active feedback loop.

Generally, in one aspect, a method for maintaining optical alignment in a free space optical communication system is provided. The method includes the steps of: transmitting at least one communication beam from a light source of a first free space optical unit (FSO) to a detector arranged proximate to a second FSO unit, the second FSO unit having one or more reflective elements; transmitting one or more alignment beams from the light source to the second FSO unit; reflecting the one or more alignment beams or one or more portions of the one or more alignment beams from the one or more reflective elements; detecting the reflected one or more alignment beams or the one or more portions of the one or more alignment beams at a light sensor; and determining whether the first FSO unit is in alignment with the second FSO unit or whether the at least one communication beam is affected by one or more environmental conditions based on the detection of the reflected one or more alignment beams or the one or more portions of the one or more alignment beams.

According to embodiments, the method further includes determining that the first FSO unit is in alignment with the second FSO unit based on the one or more alignment beams being reflected by the one or more reflective elements. The method can also include determining that the first FSO unit is not in alignment with the second FSO unit based on one or more portions of the one or more alignment beams not being reflected by the one or more reflective elements.

According to embodiments, the method further includes determining that the first FSO unit is in alignment with the second FSO unit based on none of the one or more alignment beams being reflected by the one or more reflective elements. The method can also include determining that the first FSO unit is not in alignment with the second FSO unit based on at least a portion of the one or more alignment beams being reflected by the one or more reflective elements.

According to an embodiment, the method further includes determining that the first FSO unit is not in alignment with the second FSO unit based on at least one of the one or more alignment beams being reflected by the one or more reflective elements and at least one of the one or more alignment beams not being reflected by the one or more reflective elements.

According to an embodiment, the method further includes providing the one or more reflective elements at a first distance from the first FSO unit and providing the detector at a second distance from the first FSO unit, where the first and second distances are different.

According to an embodiment, the method further includes providing the light sensor at a distance from the first FSO unit.

According to an embodiment, the method further includes transmitting a different or multiple communication beams from the light source in response to determining that the first FSO unit is not in alignment with the second FSO unit or that the at least one communication beam is affected.

According to an embodiment, the method further includes modifying one or more operating parameters of the at least one communication beam in response to determining that the first FSO unit is not in alignment with the second FSO unit or that the at least one communication beam is affected.

According to an embodiment, the method further includes transmitting one or more alignment beams from the communication beam using one or more diffractive optical elements.

Generally, in another aspect, a free space optical communication system is provided. The free space optical communication system includes: a first free space optical (FSO) unit communicably coupled with a second FSO unit, the first FSO unit having a light source and the second FSO unit having one or more reflective elements; a detector arranged proximate to the second FSO unit; at least one communication beam transmitted from the light source of the first FSO unit to the detector; one or more alignment beams transmitted from the light source to the second FSO unit; a light sensor configured to detect the one or more alignment beams or one or more portions of the one or more alignment beams reflected from the one or more reflective elements; and a controller configured to: analyze one or more reflected signals generated by the light sensor; and determine whether the first FSO unit is in alignment with the second FSO unit or whether the at least one communication beam is affected by one or more environmental conditions based on the detection of the one or more alignment beams or the one or more portions of the alignment beams being reflected.

According to an embodiment, the controller of the free space optical communication system is configured to adjust one or more operating parameters of the at least one communication beam to correct when the first FSO unit is not in alignment with the second FSO unit.

According to embodiments, the at least one communication beam and the one or more alignment beams include two light beams from a vertical-cavity surface-emitting laser (VCSEL) array having a plurality of pixels. The at least one communication beam of the system can be transmitted from a first pixel of the plurality of pixels of the VCSEL array and the controller can be configured to activate a second pixel to transmit the at least one communication beam from the second pixel to correct when the first FSO unit is not in alignment with the second FSO unit or when the at least one communication beam is affected by one or more environmental conditions.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of systems and methods of maintaining optical alignment in free space optical communication systems. More generally, Applicant has recognized and appreciated that it would be beneficial to maintain optical alignment between the transmitter and the receiver in a free space optical communication system without using an active feedback loop. A particular goal of utilization of certain embodiments of the present disclosure is to detect and automatically correct for when either the transmitter or the receiver moves to maintain good link budget quality without using active contribution from the receiver and without using the communication beam for detecting and rating alignment.

In view of the foregoing, various embodiments and implementations are directed to systems and methods for maintaining optical alignment in a free space optical (FSO) communication, particularly to maintaining optical alignment between a communication beam of a FSO transmitter and a detector of a receiver. The various embodiments and implementations can be used in a street lighting infrastructure or any kind of system providing high-speed optical communication. Systems disclosed herein include passive optical materials at the receiver side and a one or two-dimensional VCSEL array at the transmitter side that adjusts one or more operating parameters of the one or more light beams and/or activates one or more pixels of the one or two-dimensional VCSEL array to maintain optical alignment. The passive optical materials include retroreflective components arranged to reflect at least a portion of one or more alignment beams to a light sensor. The signals, generated at the light sensor based on the reflected alignment beams, can be used to determine whether the FSO units are aligned or misaligned without involving the communication beam. The signals can also be used to determine whether the communication beam is disrupted or otherwise affected by environmental conditions.

Figure 1:
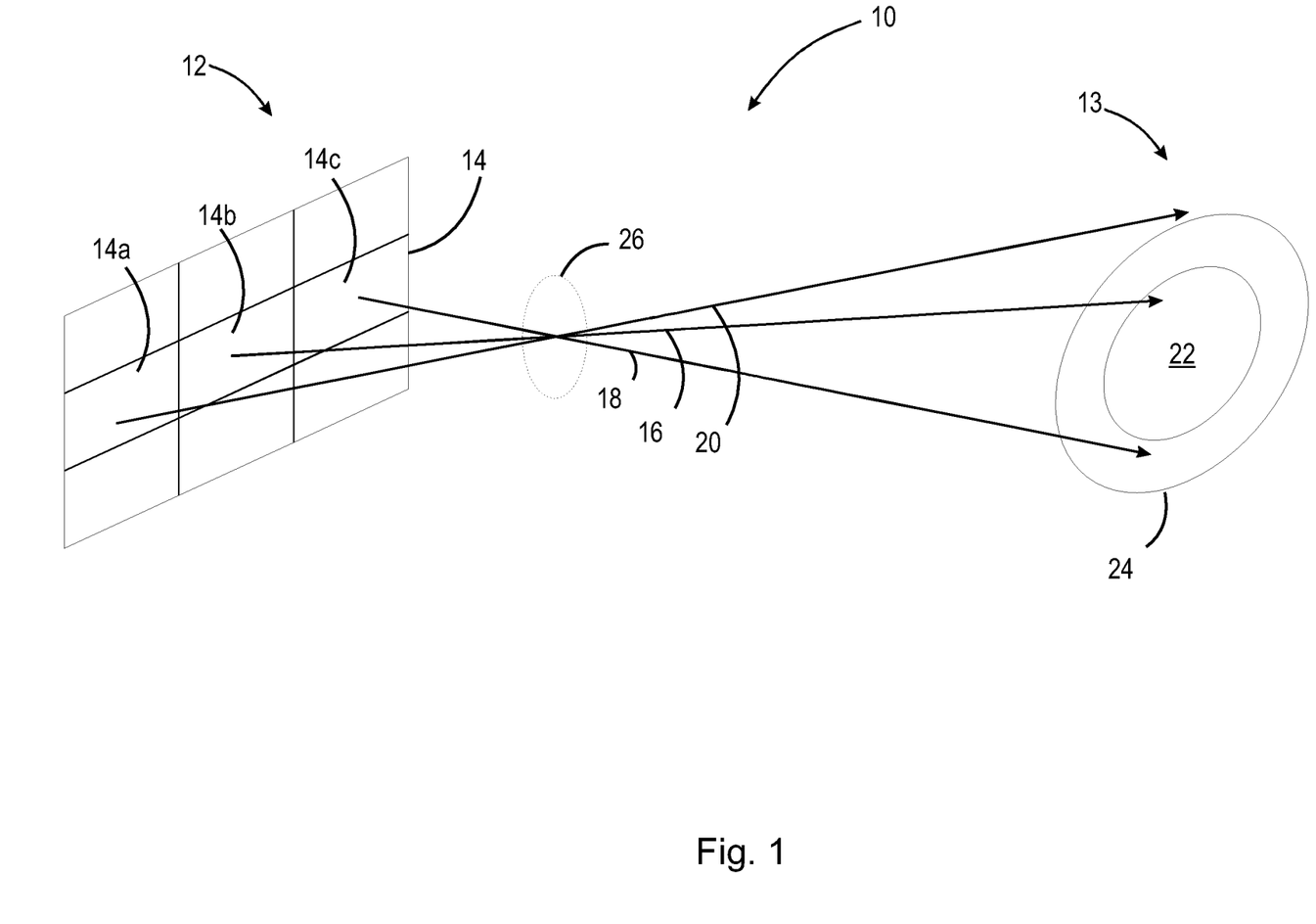
FIG. 1 illustrates a schematic perspective elevational view of a free space optical communication system, in accordance with one embodiment.

Referring to FIG. 1, in one embodiment, a free space optical (FSO) communication system 10 is depicted having a transmitting FSO unit 12 and a receiving FSO unit 13. Although only a single transmitting FSO unit and a single receiving FSO unit are shown, example FSO communication systems include pluralities of transmitting and receiving FSO units 12 and 13. In the illustrated embodiment, the transmitting FSO unit 12 includes a light source, such as a semiconductor laser comprising a one or two-dimensional array of optical transmitters 14 configured to produce communication and alignment beams 16, 18, and 20 pointed towards the receiving FSO unit 13. Each beam of light 16, 18, and 20 can be generated from a single pixel 14a, 14b, and 14c, respectively. Each pixel can generate a communication beam or an alignment beam, but not both simultaneously, according to some embodiments. In order to reduce the number of pixels (e.g., VCSELs) needed for alignment, a single VCSEL laser can be combined with a diffractive optical element (DOE) to generate multiple laser dots. Electronic switchable DOE filters can be used in example embodiments. For example, the communication beam can be split into multiple beams by a DOE where the main beam is directed towards the detector while the side beams can be reflected by the reflectors in case of (mis)alignment. However, alignment beams with fixed DOE optics cannot be used for communication purposes.

In example embodiments, the alignment beam can also act as a communication beam such that in case of misalignment the alignment beam can be used for communication advantageously. Similarly, the communication beam can also act as an alignment beam such that in case of misalignment the communication beam can be used for alignment. To distinguish which beams are reflected, the unique encoding by the location on the reflector can be used. In case of switchable diffractive optical elements, the system can switch between communication and alignment beams to limit the optical power required. The duty cycling between a single communication beam and multiple beams including communication and alignment beams can be dependent on the instability of the FSO units. Additionally, in example embodiments, by using beams with different polarization the reflected signals from different retroreflectors can be recognized. The polarization can be achieved by having beams transmitted with different polarization orientations, or using retroreflectors comprising polarization-rotating material that can change the polarization of the reflected signal. In cases where the transmitted polarized light experiences losses in the optics of the transmitter or other influences, an additional polarizing filter can be included to maintain the polarized light properties of the transmitted light beam. The polarization rotating material can be doted in such a way that it enables accurate detection of the precise location where the beams are reflected at the retroreflector. To achieve this, the polarization rotating material can include different optical properties depending on where the material is positioned.

In example embodiments, the wavelengths of the communication and alignment beams can be different. The bandwidth of the optical receiver on the receiving side can be sufficient to receive the different wavelengths. The receivers on the transmitting side could have optical filters with very small bandwidth to distinguish the reflected signals of the alignment beams.

In example embodiments, the amplitude of the alignment and communication beams can be different such that the strength of the reflected signal can be used to identify the origin of the reflected signal. Also, the signal strength of the alignment beams could be lower to limit required optical energy.

In additional example embodiments, the carrier frequency can differ between communication and alignment beams. The receiving side can be robust against slightly different carrier frequencies, while the transceiver is able to detect the different carrier frequencies of the alignment beams.

The phase of the alignment and communication signals can be different in example embodiments. On the transmitting side, phase measurement can be used to detect the origin of the reflected signal. On the receiving side, the communication signal will have a small interruption when exposed to the alignment beam instead of the communication beam.

In example embodiments, instead of using polarization and other differences to create uniqueness at different locations on the retroreflector, the surface of the retroreflector that faces the transmitting FSO unit can include height differences. In such embodiments, depending on where the beams are reflected on the retroreflector including the height differences different time of flight timings can be created. Using the different elevations on the surface of the retroreflector, it can be determined where exactly on the retroreflector the beam is being reflected. For example, when using wavelengths such as 1310 nm, a number of different waves can be created that fit the transmitter-to-reflector distance.

In example embodiments, distance information can be used to detect when different alignment beams are not present. In these embodiments, the retroreflective parts should have different 3D properties such that a different distance signal can be measured.

Although there are three beams shown in FIG. 1 including a communication beam 16 and two alignment beams 18 and 20, example FSO communication systems can include additional communication and alignment beams. While the three beams that are illustrated are shown in the form of a one-dimensional array, the beams can also be configured in a two-dimensional array as further described herein. The receiving FSO unit 13 includes a detector 22 that has a limited field of view and each of the beams 16, 18, and 20 are highly directional and narrow, ranging between 5-8 cm in diameter. In example embodiments, suitable beams can be larger or smaller in diameter. The size of the beam is a tradeoff between maximum power transmitted for eye safety and maximum power to be delivered by a relatively low cost communication laser and a good signal to noise ratio enabling a low bit error rate in optical communication.

One issue faced by the free space optical system 10 is maintaining optical alignment or a direct optical path (e.g., the shortest straight path) between the transmitting FSO unit 12 and the receiving FSO unit 13. Any technology or protocol for achieving a locked beam between the FSO units 12 and 13 may be utilized. In operation, the transmitting and receiving FSO units 12 and 13 are movable due to weather and other factors, e.g., wind sway, thermal expansion, and vibration. Because of the narrowness of the transmitted beam and the limited field of view of the detector 22 at the receiving FSO unit 13, such movement can affect beam alignment and interrupt communication. Other environmental conditions, such as, fog can also interrupt communication even when the transmitting and receiving FSO units are not moving. In embodiments described herein, the receiving FSO unit 13 can include passive optical materials arranged around the limited field of view detector 22 to reflect one or more alignment beams 18 and 20. When the communication beam 16 veers away from the direct optical path or when one or more environmental condition affects the communication beam 16, the alignment beams 18 and 20 also veer away from their positions of alignment or become affected, respectively. The reflected alignment beams 18 and 20 can be used to detect misalignment between the FSO units 12 and 13 or when one or more environmental conditions are affecting the free space optical communication system.

In FIG. 1, the detector 22 of the receiving FSO unit 13 is configured to receive the communication beam 16 from the optical transmitter 14 and passive optical materials 24 surrounding the detector 22 are configured to reflect alignment beams 18 and 20 or portions of the alignment beams towards the transmitting FSO unit 12. When the FSO units are properly aligned optically, the communication beam 16 is directed to, and received by, the detector 22 and the alignment beams 18 and 20 are directed to, and reflected by, the optical materials 24. Since FIG. 1 shows the FSO units not properly aligned optically, one of the alignment beams 18 hits the optical materials 24 and the other alignment beam 20 misses the optical materials 24. Of course in other embodiments of misalignment, alignment beam 20 can hit the optical materials 24 and the other alignment beam 18 can miss the optical materials 24. The absence of reflection of either of the alignment beams or both of the alignment beams can be detected by a light sensor having one or more sensing elements (shown in FIG. 2) and thus, the system can detect misalignment.

Any technology or protocol for transmitting data in communication beams may be utilized by the FSO unit(s) 12. For example, the communication beam 16 may be encoded with information by modulating a carrier signal with a modulating signal that contains the information desired to be transmitted. The wavelength of the communication beam 16 can be set outside the visual spectrum if desired, which may enable the detector 22 to more easily differentiate the communication beam 16 from ambient light, and therefore detect the communication beam 16. In embodiments, the communication beam 16 is generated having known and measurable characteristics, e.g., a known wavelength outside the visual spectrum and/or modulated with a carrier signal having a set base frequency. In embodiments, the wavelength of the communication beam 16 is altered depending on the time of day to account for changing ambient conditions, e.g., due to the changing light spectrum from the sun or other light sources throughout the day. Furthermore, the communication beam 16 may be transmitted in a collimated or parallel manner, with little or no divergence, e.g., to facilitate accurate long-range transmission. For example, the emitted communication and/or alignment beams can be collimated by optics, e.g., an aspheric lens 26, to form collimated light beams that are pointed towards the receiving FSO unit 13. In other example embodiments, a light torch can be included to focus the communication and/or alignment beams.

In example embodiments, the FSO units 12 and 13 can be mounted at elevated positions in any suitable outdoor structure, e.g., a streetlamp, to avoid the FSO units 12 being blocked or interfered with by people, vehicles, etc. The term "streetlamp" or "streetlight" as used herein refers to any outdoor lighting infrastructure that includes a light fixture, such as a light fixture, extending from a support, such as a pole, in order to illuminate an area proximate to the streetlamp. The pole may be built specifically for the streetlamp, or may be used for some other purpose, e.g., a utility pole. It is to be appreciated that in other embodiments, one or more of the streetlamps may include or extend from other types of infrastructure, such as signage, buildings, bridges, or the like.

Advantageously, streetlamps, which must already be electrically wired to power the light fixtures, can provide electrical hookups for the FSO units 12 and 13. Furthermore, streetlamps are commonly installed at regular intervals along a road, street, sidewalk, or other path, which extends to and/or between various locations where people reside, work, or otherwise desire high data rate communication. In this way, by installing the FSO units 12 and 13 at streetlamps, the system 10 can be formed as a connected network of FSO units, e.g., extending in any desired direction throughout all or part of a city, town, or other locations. Additionally, it is to be appreciated that existing streetlamp infrastructure can be leveraged by retrofitting the FSO units on existing streetlamps. It is also to be appreciated that not every one of the FSO units in the system 10 needs to be installed on a streetlamp. For example, certain ones of the FSO units may be mounted on signage, buildings, or other infrastructure.

As discussed above, the communication beam 16 is generated by one of the transmitting FSO units 12, via the optical transmitter 14, and directed toward a designated one of the receiving FSO units. The transmitting FSO unit 12 can include a semiconductor laser structure arranged with any number of pixels that can generate one or more communication beams such that if the original communication beam 16 has been displaced, e.g., due to swaying streetlamps, one or more other pixels can be activated to generate communication beams to take over for the displaced beam. One or more operating parameters of the communication beams can also be adjusted additionally or alternatively to maintain optical alignment with respect to the intended target (e.g., the detector). The pixels of the VCSELs can be driven by any suitable driver. Although any single pixel can be activated, it should be appreciated that any group of pixels, a row, or any group of rows can also be activated in example embodiments.

Figure 2:
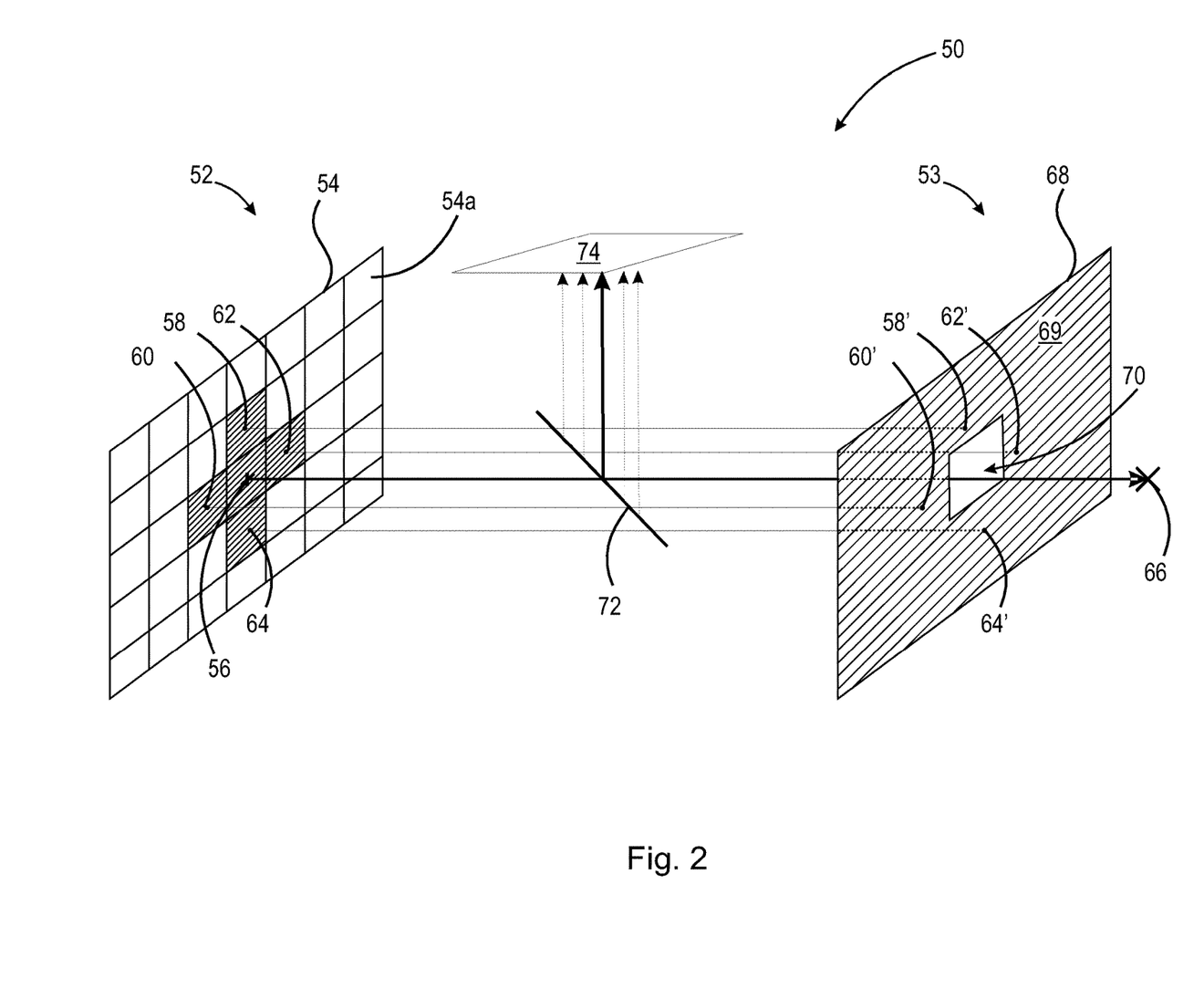
FIG. 2 illustrates a schematic perspective elevational view of a free space optical communication system, in accordance with one embodiment.

Referring to FIGS. 1 and 2, the receiving FSO unit 13 includes passive optical materials 24, e.g., a retroreflector 68, surrounding detector 22, 66. The term "retroreflector" as used herein should be construed to mean any device or surface that automatically returns radiation along a vector toward the source of radiation. Although retroreflector 68 is reflective or includes reflective parts, it should be understood that the detector 22, 66 may reflect a very small portion of the light, depending on the chosen wavelength, but is initially intended to be optimized to absorb all light and therefore non reflective. Thus, in example embodiments the portion of light that can be reflected from detector 22, 66 can be used for alignment. Although FIG. 1 illustrates detector 22 arranged in the center of optical materials 24, FIG. 2 illustrates detector 66 arranged at a distance from retroreflector 68. As shown in FIG. 2, retroreflector 68 can include an opening 70 arranged substantially in the center of the retroreflector and the detector 66 can be arranged at a distance beyond the retroreflector such that the communication beam 56 travels through opening 70 and then hits detector 66 to communicate data. The reflective material can also be placed in a plane behind the detector in other embodiments. In other words, instead of the retroreflector being arranged closer to the transmitting FSO unit than the detector as shown in FIG. 2, the detector can be arranged closer to the transmitting FSO unit than the retroreflector. Moreover, if the relationship between the reflector and detector is known, the reflective material can be placed in close vicinity to the detector.

While FIG. 1 shows an example of misalignment between the FSO units, FIG. 2 shows an example of alignment between the FSO units in a FSO communication system 50. In FIG. 2, the transmitting FSO unit 52 includes optical transmitters 54, e.g., pixels 54a, configured to generate communication and alignment beams 56, 58, 60, 62, and 64. In the configuration shown in FIG. 2, transmitting FSO unit 52 can transmit a single communication beam 56 surrounded by four alignment beams 58, 60, 62, and 64. It should be appreciated that the pixels generating the alignment beams can be configured to generate additional communication beams instead. Additionally or alternatively, other pixels not designated can generate additional communication or alignment beams as needed. The communication beam 56 passes through opening 70 of receiving FSO unit 53 and hits detector 66 in the embodiment where the detector is further than the retroreflector. In embodiments where the detector is closer than the retroreflector, the communication beam hits the detector before having to pass through any opening in the receiving FSO unit. All of the alignment beams hit the reflective material 69 of the retroreflector 68 at the points of reflection 58', 60', 62' and 64' and are reflected back towards transmitting FSO unit 52. In the embodiment shown in FIG. 2, the reflected alignment beams hit a beam splitter 72 on their way back towards transmitting FSO unit 52 and are redirected towards two-dimensional light sensor array 74. Light sensor array 74 is one type of smart detector configured to register the reflections. The beam splitter shown in FIG. 2 has a reflective side and a transmissive side. In the embodiment shown, the communication and alignment beams are able to pass through the transmissive side facing FSO unit 52 and reflect off the reflective side facing FSO unit 53. The term "smart" as used herein should be construed to mean a device that is configured (in addition to detecting the reflected light) to assist the systems 10, 50 in maintaining optical alignment between the depicted transmitting FSO unit 12, 52 and the receiving FSO unit 13, 53.

Figure 3A:
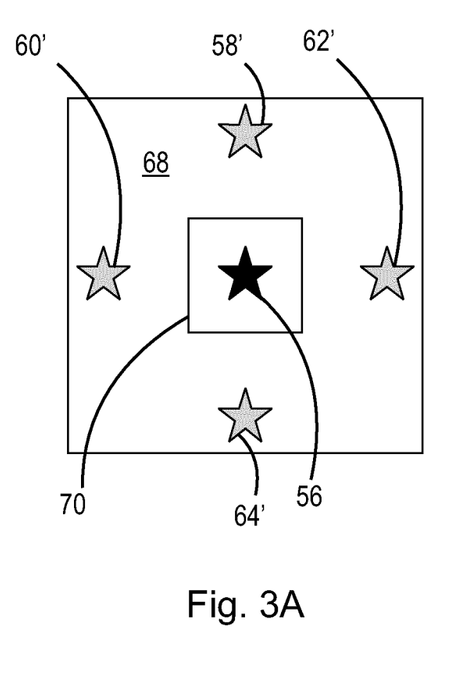
FIG. 3A illustrates an example of a communication beam and four alignment beams in alignment, in accordance with one embodiment.
Figure 3B:
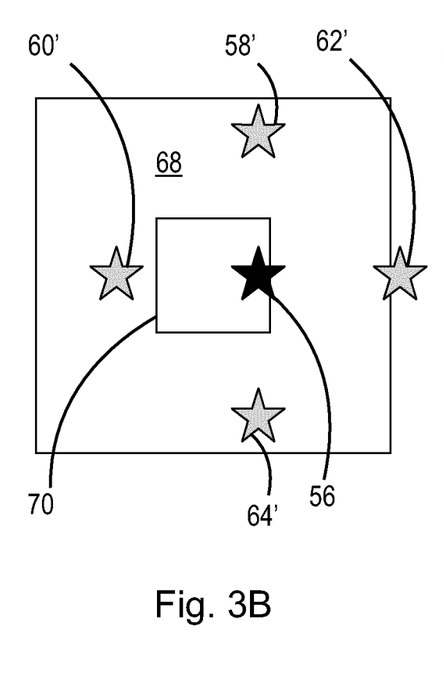
FIG. 3B illustrates an example of a communication beam and four alignment beams not in alignment, in accordance with one embodiment.
Figure 3C:
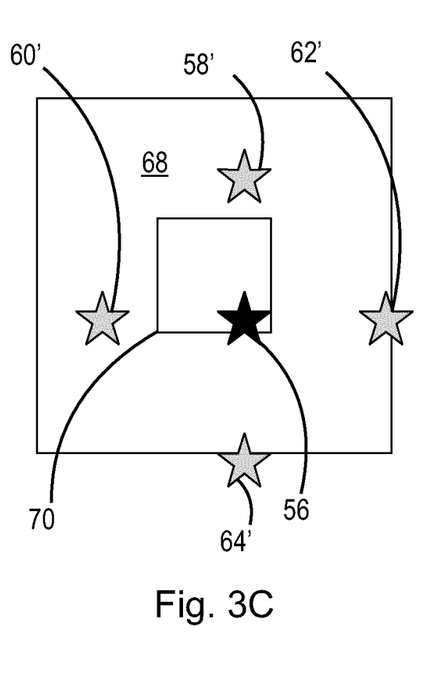
FIG. 3C illustrates an example of a communication beam and four alignment beams not in alignment, in accordance with one embodiment.

FIG. 3A shows the reflection positions of alignment beams 58, 60, 62, and 64 on retroreflector 68 in FIG. 2 which surround the communication beam 56 that is perfectly aligned. FIGS. 3B and 3C show the reflection positions of alignment beams 58, 60, 62, and 64 on retroreflector 68 when the communication beam 56 is not perfectly aligned. Regardless of the examples of misalignment illustrated in FIGS. 3B and 3C, the communication beam 56 is still able to maintain a communication link with the detector. If the misalignment worsens, the communication link could become interrupted. In the situations depicted in FIGS. 3B and 3C, the system 50 will either warn or correct the misalignment, e.g., by using different VCSELs or changing the operating parameters, to prevent interruption of the communication link between the communication beam 56 and the detector 66. Operating parameters can include direction (e.g., with respect to x, y, and/or z coordinates), focus, intensity, wavelength, or modulation characteristics.

The two-dimensional light sensor array 74 or any smart detector can detect the reflected light signals and the absence of reflected light signals (e.g., binary signals).

The light sensor array can also be a single element light sensor in embodiments. In case the alignment beams have different carrier frequencies with a single element the individual contributions of each alignment beam can be determined. Also, different low frequency signals for the individual alignment beams can be superimposed on top of the communication signal. The low frequency signal does not influence the communication bandwidth.

Figure 3D:
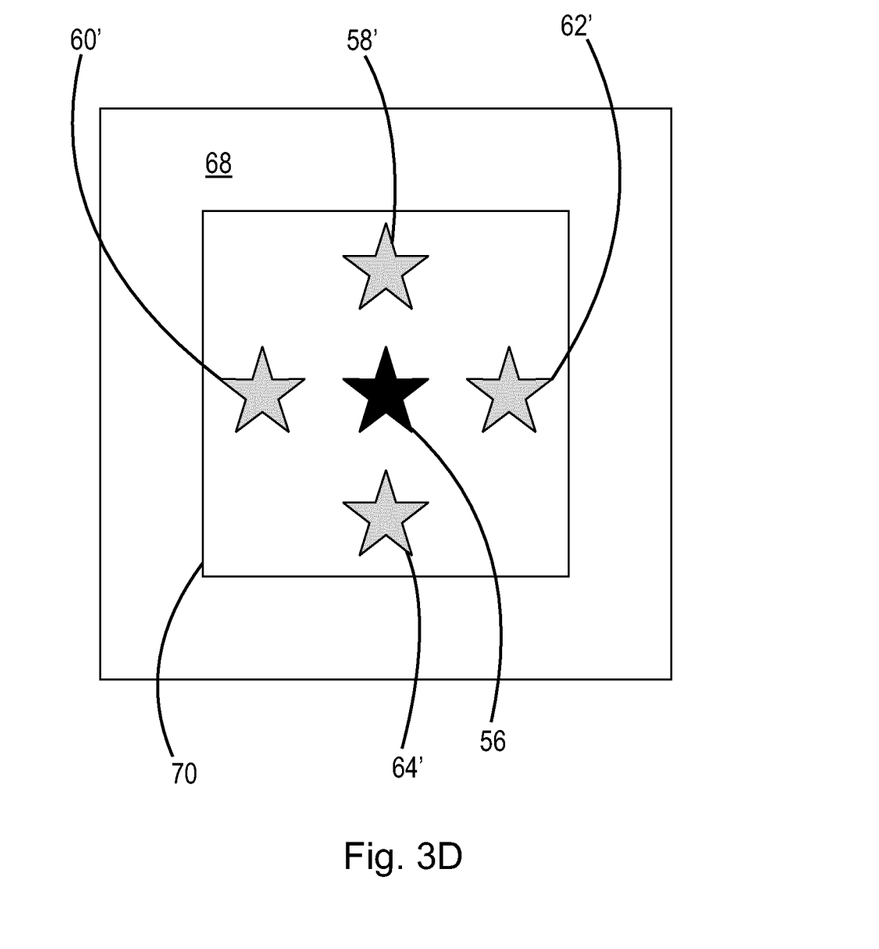
FIG. 3D illustrates an example of a communication beam and four alignment beams in alignment, in accordance with one embodiment.

Instead of having a retroreflector around the detector to reflect all the alignment beams in case of correct alignment, the retroreflector could be arranged such that there is no reflection of the alignment beams in case of correct alignment as shown in FIG. 3D. In FIG. 3D, alignment beams 58, 60, 62, and 64 surround communication beam 56 in alignment yet do not hit retroreflector 68. When misalignment occurs in this case, one or more of alignment beams 58, 60, 62, and 64 or portions of one or more alignment beams 58, 60, 62, and 64 will be reflected by retroreflector 68 and detected by a single or multiple element light sensor.

The two-dimensional light sensor array 74 may include a communication module that is arranged to communicate the detected or missing signals between the transmitting FSO unit 12, 52 that transmitted the communication and alignment beams and a controller. The transmitting FSO unit may include or be in communication with the same controller or another controller. The controller can facilitate operation of the components of the transmitting FSO unit. The controller can include a processor, a memory, and/or a communication module. The processor may take any suitable form, such as a microcontroller, plural microcontrollers, circuitry, a single processor, or plural processors configured to execute software instructions. The memory may take any suitable form or forms, including a volatile memory, such as random access memory (RAM), or non-volatile memory such as read only memory (ROM), flash memory, a hard disk drive (HDD), a solid state drive (SSD), or other data storage media. The memory may be used by the processor for the temporary storage of data during its operation. Data and software, such as the data transmitted via the beams and/or the algorithms or software necessary to modulate signals to generate the beams, analyze the transmitted data, orient the FSO units 12, 52, 13, and 53, as well as an operating system, firmware, or other application, may be installed in the memory. The communication module is arranged to enable communication between the components of the systems 10, 50. The communication module may be any module, device, or means capable of enabling the transmission and/or reception of a wired or wireless communication signal, utilizing technologies that include, but are not limited to Wi-Fi (e.g., IEEE 802.11), Bluetooth, cellular, Ethernet, Zigbee, etc.

The controller may be embedded into the transmitting FSO unit 12, 52 or a light fixture (e.g., to enable functionality of a smart or connected light system). In one embodiment, the systems 10, 50 and/or a streetlamp assembly includes multiple controllers that provide at least some of the functionality disclosed herein, and which together form the controller as described. Additionally, it is to be appreciated that some or all of the computing resources for the controller may be implemented by designated network infrastructure and/or cloud-based computing devices (e.g., a server, gateway, router, or other computing device in communication with the system 10 via the interne or other data network).

A controller of the system can use such detected or missing signals to determine that a misalignment is present and whether and to what extent corrective measures are needed. Once the system detects a misalignment, the system can modify one or more operating parameters, e.g., beam angle width, or activate different lasers of the light source to keep the beam in lock and to maintain good link budget quality. In example embodiments, the system can continuously make adjustments based on detected or missing reflected signals. In alternate embodiments, the system can make discrete adjustments based on the same information. Since the data that represents the alignment of the incident portion only requires a limited transmission of data, a relatively shorter range and/or lower data rate communication technology may be used to communicate this information, e.g., Wi-Fi.

In example embodiments, instead of retrieving a binary signal when the beam is not reflected, the light sensor array can also be used to determine a location of the detector boundary. The reflected signal can change for different locations with respect to the boundary of the detector. For example, the beam angle width of the VCSEL can be such that the signal is partly reflected close to the detector boundary. As a result, a reflected signal that exhibits amplitude that varies with the distance to the boundary can be detected. Temporal analysis of the reflected signal can provide an accurate indication of the boundary location. Another method of localizing the boundary can involve temporal analysis of an adapting beam angle width since the beam angle width increases when it is distant from the boundary and the beam angle width decreases when it moves closer to the boundary. One or more probing VCSELS can be used to analyze the reflected signals and/or the adapting beam angle width. Increasing the number of probing VCSELS allows the systems to utilize interpolation to determine the detector boundary with improved accuracy.

Figure 4:
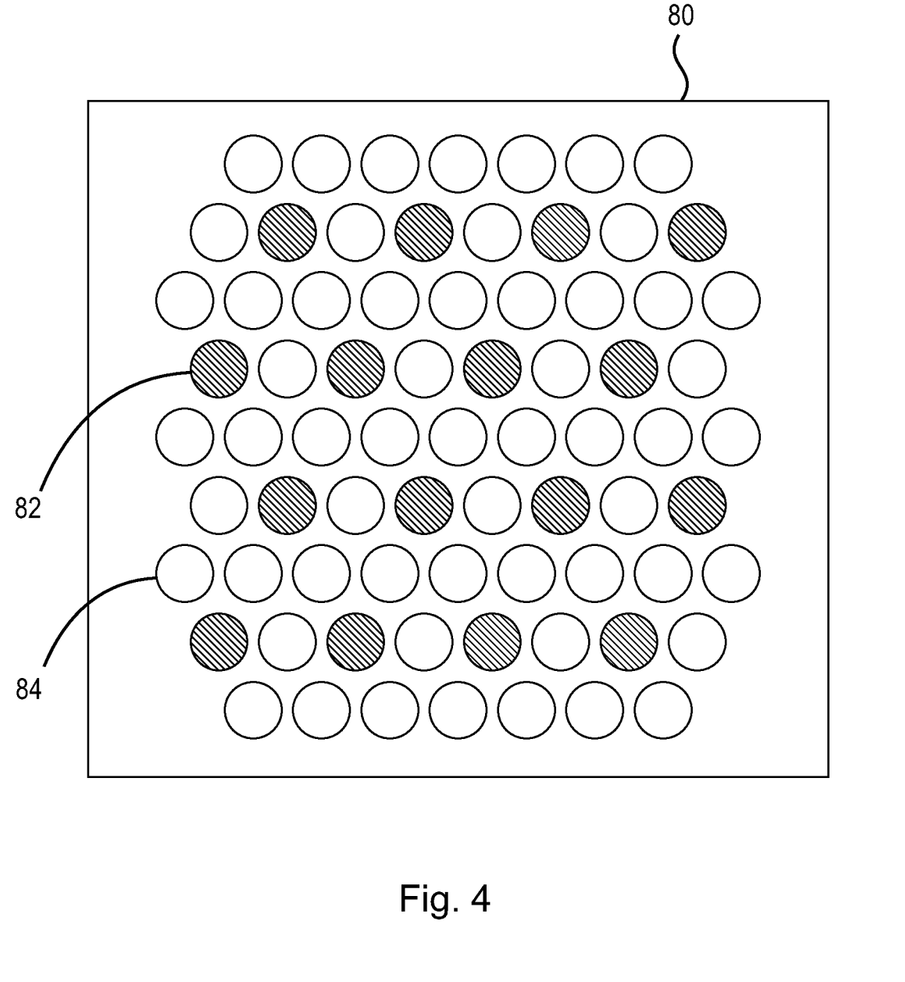
FIG. 4 illustrates an example of a two-dimensional array of vertical-cavity surface-emitting lasers (VCSELs) including embedded light sensors, in accordance with one embodiment.
Figure 5:
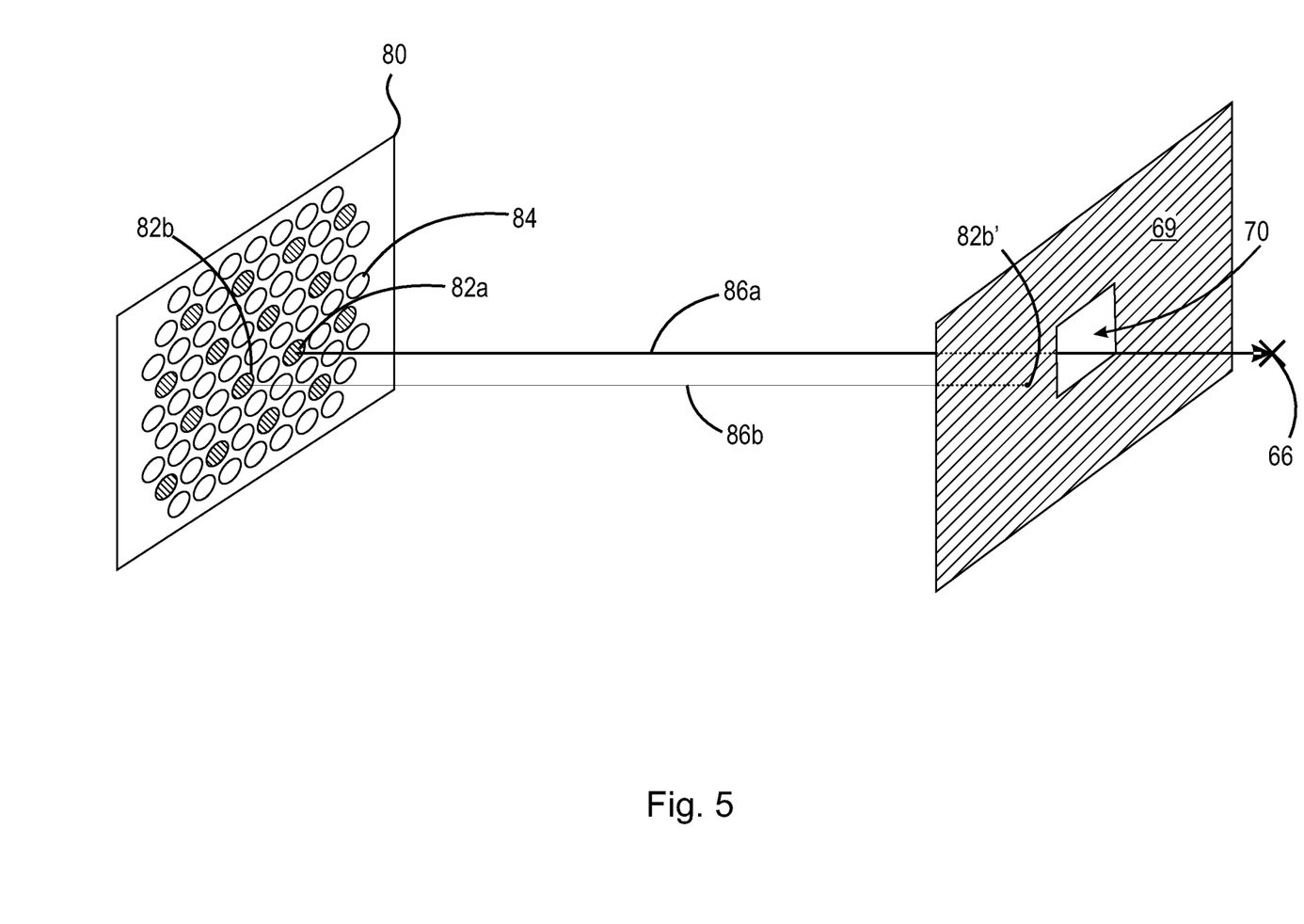
FIG. 5 illustrates a schematic perspective elevational view of a free space optical communication system including the two-dimensional array of VCSELs and embedded light sensors as shown in FIG. 4, in accordance with one embodiment.
Figure 6:
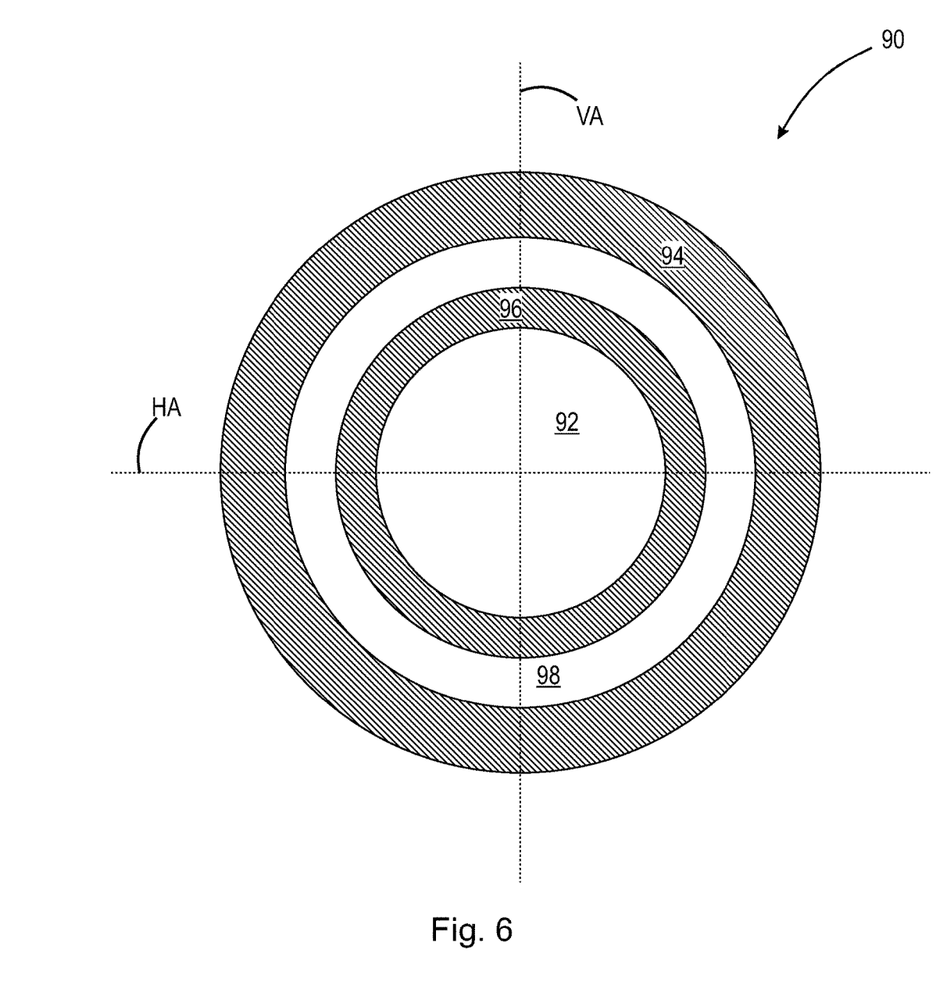
FIG. 6 illustrates a schematic elevational view of a ring-shaped retroreflector, in accordance with one embodiment.

Alternative embodiments for the systems described herein can be appreciated in view of FIGS. 4, 5, and 6. Instead of using a beam splitter and a single or multiple light sensors arranged at a distance from the transmitting FSO unit, the light sensors can be embedded on VCSEL array 80 as shown in FIGS. 4 and 5. The communication and alignment beams described herein can be generated from one or more of the pixels 82 and the areas surrounding the pixels can include sensors 84 to obtain the reflected or missing signals described herein. As shown in FIG. 5, laser 82a can be activated to generate a communication beam 86a that communicates with detector 66 through opening 70. Simultaneously, a separate laser 82b can be activated to generate an alignment beam 86b that hits retroreflective material 69 and is reflected back towards the light sensors 84. If the receiving FSO unit moves such that the alignment beam 86b is no longer reflected back towards the light sensors (and is instead passing through opening 70), laser 82b can be controlled to generate a communication beam instead. Placing the optical sensors on the same chip as the VCSELs is advantageous in that the beam splitter and separate light sensor array described herein can be dispensed with. Additionally, useful range information can be retrieved since the embodiments described herein combine retroreflectors with lasers having small beam angles. Range information can be obtained over a large range (e.g., a range that is greater than 10 m). In example embodiments, range information can be derived via optical time-of-flight sensing. This range information can also provide movement in the axial direction and when using combining ranges measured by multiple beams also the pose of the retroreflector. In another embodiment, one or more photodiodes can be arranged adjacent to the VCSEL array rather than embedded on the VCSEL array to directly measure the reflected signals. In combination with accelerometers at the transmitter side, such an axial distance measurement can reveal information on which of the two, transmitter or detector, is moving. This information can be important for providing (near) system failures in terms of mechanical failures or mounting problems at the transmitter and/or receiver side. For example, an axial distance measurement corresponding fully with accelerometer data means all movement is initiated by the transmitter and not by the receiver.

In further embodiments, the retroreflectors described herein as well as the openings within them can take other shapes and/or configurations. For example, the retroreflector can be embodied as a ring-shaped retroreflector and can include a ring-shaped detector substantially in the middle of the retroreflector. Of course, the shape of the retroreflector need not match the shape of the detector. Thus, it should be appreciated that a ring-shaped retroreflector can include a detector that is shaped as a quadrilateral, or vice versa. Moreover, it should be appreciated that any suitable shapes can be used instead or additionally. Referring to FIG. 6, retroreflector 90 can also include opening 92 in which one or more communication beams can pass. Opening 92 can be positioned at the intersection of the horizontal and vertical axes HA, VA of the retroreflector. However, the opening need not be positioned at the intersection of the axes in other contemplated embodiments. Retroreflector 90 can also include multiple concentric rings 94, 96 such that the absence of reflection between the rings within surface 98 can be used for additional alignment or misalignment detection.

In example embodiments, a single VCSEL can be activated and the location of the reflection on the light sensor can be measured to automatically select which VCSELs serve as communication and alignment beams. Since a single VCSEL has limited power, by selecting only the VCSELs that arrive at the detector, power consumption can be limited advantageously. With a duty-cycle a small portion of the lasers inside the VCSEL array can be activated to check the alignment because for many applications the alignment check in the area of tenths of Hz is sufficient. Then correction is required and the duty-cycle can be increased and adapted to weather conditions or other conditions, which potentially influence the alignment.

In example embodiments, a portion of the VCSEL array can be used to compensate for small alignment deviations by moving the alignment beams along the VCSEL array. By activating lasers in the VCSEL array, mechanical adjustment of the FSO units is not yet required. In embodiments, the FSO units can be mechanically adjusted in cases where the alignment deviation is too large to be accommodated by moving the alignment beams along the VCSEL array.

In another embodiment, a VCSEL transmitter for optical tracking can enable the opportunity to improve or maintain the signal-to-noise ratio while improving energy efficiency of the optical link. Based on the measured or expected pattern of a pole swing, the optimal VCSEL element(s) can be activated. For example, only one row of elements in case of horizontal movement could be used. Depending on the swing amplitude a single element up to all elements on the row can be used. The used VCSEL elements can also depend on the weather type (e.g., light scattering by fog). Besides the optical measurement concepts described herein, the pole swing could also be measured with, for example, an accelerometer or differential GPS tracking. Additionally or alternatively, a detector can be provided that is configured to determine whether an amount of vibration exceeds a particular threshold. In that case, a particular larger set of pixels can be activated to generate communication beams to ensure the communication link is not lost.

In other embodiments, the pixels can be configured to transmit communication and/or alignment beams at different wavelengths. In situations where particular environmental conditions affect certain beams at certain wavelengths, other pixels at different wavelengths can be utilized or the wavelengths can be adjusted accordingly.

Figure 7:
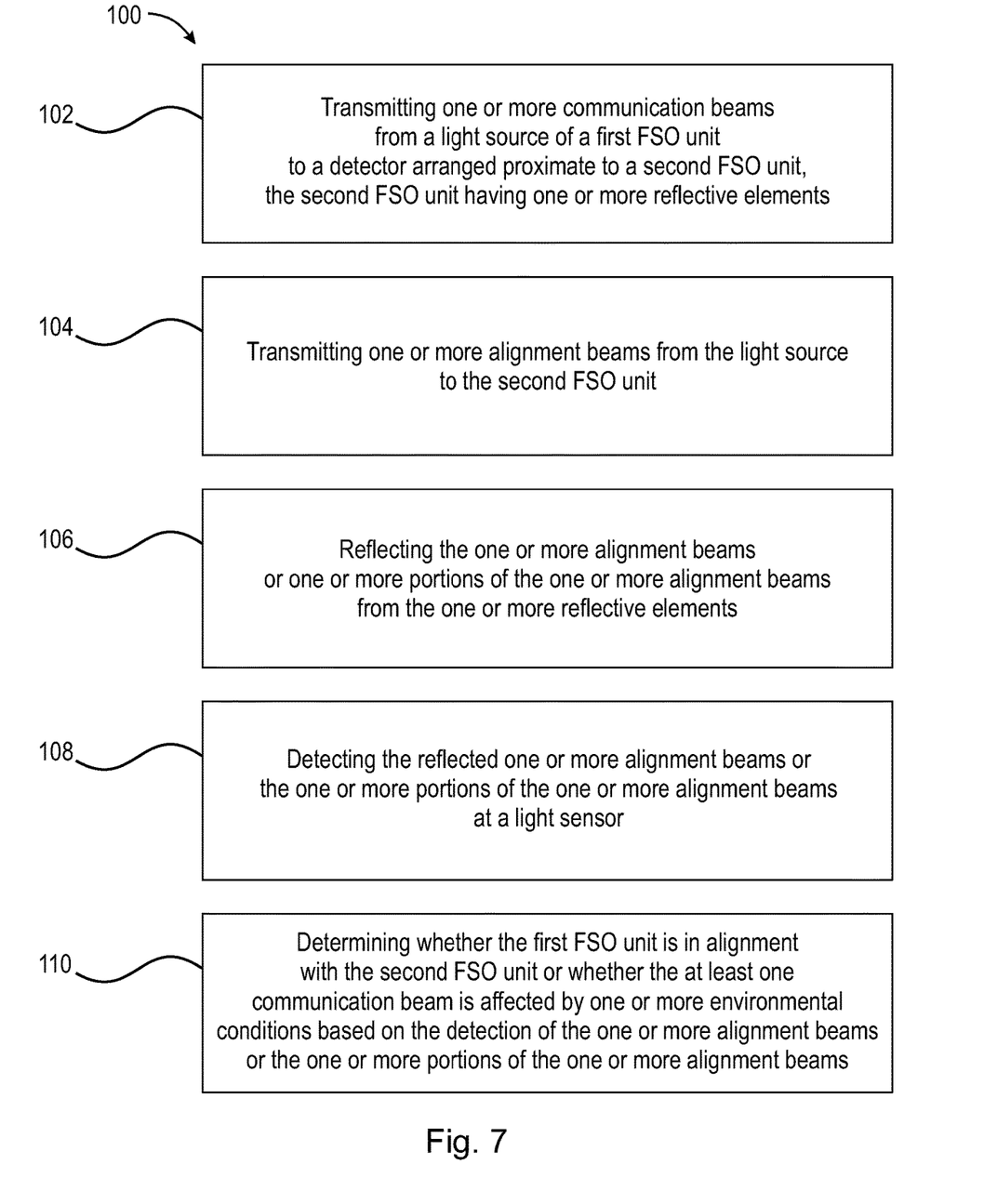
FIG. 7 is a flowchart illustrating a method for maintaining optical alignment in a free space optical communication system, in accordance with one embodiment.

A method 100 for maintaining optical alignment in a free space optical communication system is illustrated in FIG. 7. At step 102, a light source of a transmitting FSO unit (e.g., FSO unit 12) transmits at least one communication beam (e.g., the beam 16) toward a detector arranged proximate to the receiving FSO unit (e.g., FSO unit 13) to communicate data. The receiving FSO unit includes one or more retroreflective elements. At step 104, the light source of the transmitting FSO unit transmits one or more alignment beams to the receiving FSO unit including the retroreflective elements. At step 106, the one or more alignment beams or one or more portions of the alignment beams is reflected from the retroreflective elements. At step 108, the one or more alignment beams or the one or more portions of the one or more alignment beams that are reflected from the retroreflective elements are detected at a light sensor. At step 110, it is determined whether the first and second FSO units are aligned based on the detection of the reflected one or more alignment beams or the one or more portions of the one or more alignment beams.

In embodiments, the method continues while the free space optical communication system operates. Thus, the receiver and/or the transmitter can both move while the reflected light from the surface of the receiver continuously provides information to the transmitter indicating in which direction it should compensate in order to keep the optical alignment.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method for maintaining optical alignment in a free space optical communication system, the method comprising:
    transmitting at least one communication beam from a light source of a first free space optical unit to a detector arranged proximate to a second FSO unit, the second FSO unit comprising one or more reflective elements, the first and second FSO units being at a distance from each other and not housed within the same device;
    transmitting one or more alignment beams from the light source to the second FSO unit;
    reflecting the one or more alignment beams or one or more portions of the one or more alignment beams from the one or more reflective elements;
    detecting the reflected one or more alignment beams or the one or more portions of the one or more alignment beams at a light sensor; and
    determining whether the first FSO unit is in alignment with the second FSO unit or whether the at least one communication beam is affected by one or more environmental conditions based on the detection of the reflected one or more alignment beams or the one or more portions of the one or more alignment beams,
    wherein the at least one communication beam and the one or more alignment beams comprise two light beams from a vertical-cavity surface-emitting laser array comprising a plurality of pixels.

2. The method of claim 1, further comprising determining that the first FSO unit is in alignment with the second FSO unit based on the one or more alignment beams being reflected by the one or more reflective elements.

3. The method of claim 2, further comprising determining that the first FSO unit is not in alignment with the second FSO unit based on one or more portions of the one or more alignment beams not being reflected by the one or more reflective elements.

4. The method of claim 1, further comprising determining that the first FSO unit is in alignment with the second FSO unit based on none of the one or more alignment beams being reflected by the one or more reflective elements.

5. The method of claim 4, further comprising determining that the first FSO unit is not in alignment with the second FSO unit based on at least a portion of the one or more alignment beams being reflected by the one or more reflective elements.

6. The method of claim 1, further comprising determining that the first FSO unit is not in alignment with the second FSO unit based on at least one of the one or more alignment beams being reflected by the one or more reflective elements and at least one of the one or more alignment beams not being reflected by the one or more reflective elements.

7. The method of claim 1, further comprising providing the one or more reflective elements at a first distance from the first FSO unit and providing the detector at a second distance from the first FSO unit, where the first and second distances are different.

8. The method of claim 1, further comprising providing the light sensor at a distance from the first FSO unit.

9. The method of claim 1, further comprising transmitting a different or multiple communication beams from the light source in response to determining that the first FSO unit is not in alignment with the second FSO unit or that the at least one communication beam is affected.

10. The method of claim 1, further comprising modifying one or more operating parameters of the at least one communication beam in response to determining that the first FSO unit is not in alignment with the second FSO unit or that the at least one communication beam is affected.

11. The method of claim 1, further comprising transmitting one or more alignment beams from the communication beam using one or more diffractive optical elements.

12. A free space optical communication system, comprising:
a first free space optical unit communicably coupled with a second FSO unit, the first FSO unit comprising a light source and the second FSO unit comprising one or more reflective elements, the first and second FSO units being at a distance from each other and not housed within the same device;
a detector arranged proximate to the second FSO unit;
at least one communication beam transmitted from the light source of the first FSO unit to the detector;
one or more alignment beams transmitted from the light source to the second FSO unit;
a light sensor configured to detect the one or more alignment beams or one or more portions of the one or more alignment beams reflected from the one or more reflective elements; and
a controller configured to:
analyze one or more reflected signals generated by the light sensor; and
determine whether the first FSO unit is in alignment with the second FSO unit or whether the at least one communication beam is affected by one or more environmental conditions based on the detection of the one or more alignment beams or the one or more portions of the alignment beams being reflected,
wherein the at least one communication beam and the one or more alignment beams comprise two light beams from a vertical-cavity surface-emitting laser (VCSEL) array comprising a plurality of pixels.

13. The system of claim 12, wherein the controller is configured to adjust one or more operating parameters of the at least one communication beam to correct when the first FSO unit is not in alignment with the second FSO unit.

14. The system of claim 12, wherein the at least one communication beam is transmitted from a first pixel of the plurality of pixels of the VCSEL array and the controller is configured to activate a second pixel to transmit the at least one communication beam from the second pixel to correct when the first FSO unit is not in alignment with the second FSO unit or when the at least one communication beam is affected by one or more environmental conditions.

* * * * *